US007154428B2

(12) United States Patent
de Clercq et al.

(10) Patent No.: US 7,154,428 B2
(45) Date of Patent: Dec. 26, 2006

(54) REMOTE CONTROL WITH SELECTIVE KEY ILLUMINATION

(75) Inventors: Stephan de Clercq, Newport Beach, CA (US); Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 419 days.

(21) Appl. No.: 10/603,975

(22) Filed: Jun. 25, 2003

(65) Prior Publication Data

US 2004/0268391 A1    Dec. 30, 2004

(51) Int. Cl.
| | |
|---|---|
| H04L 17/02 | (2006.01) |
| H03K 17/94 | (2006.01) |
| H03M 11/00 | (2006.01) |
| G06F 13/00 | (2006.01) |
| G06F 3/00 | (2006.01) |
| H04N 5/44 | (2006.01) |
| H04N 5/445 | (2006.01) |

(52) U.S. Cl. .................... 341/175; 341/174; 341/176; 341/22; 341/23; 725/37; 725/38; 725/81; 455/151.2; 348/734

(58) Field of Classification Search ............... 341/175, 341/22, 23, 174; 345/8; 340/825.72, 825.25, 340/825; 455/151.2, 8; 725/38, 37, 81, 725/141; 348/734

See application file for complete search history.

(56) References Cited

U.S. PATENT DOCUMENTS

| | | | |
|---|---|---|---|
| 4,825,200 A * | 4/1989 | Evans et al. ................... 341/23 |
| 5,410,326 A * | 4/1995 | Goldstein ................... 348/734 |
| 5,481,256 A | 1/1996 | Darbee et al. |
| 5,568,367 A | 10/1996 | Park |
| 5,747,756 A | 5/1998 | Boedecker |
| 5,818,361 A * | 10/1998 | Acevedo ...................... 341/23 |
| 5,959,751 A | 9/1999 | Darbee et al. |
| 5,977,901 A | 11/1999 | Fenner |
| 6,014,092 A | 1/2000 | Darbee et al. |
| 6,225,938 B1 | 5/2001 | Hayes et al. |
| 6,278,499 B1 * | 8/2001 | Darbee et al. .............. 348/734 |
| 6,703,963 B1 * | 3/2004 | Higginson ................... 341/176 |
| 6,794,992 B1 * | 9/2004 | Rogers .................. 340/825.25 |
| 6,906,701 B1 * | 6/2005 | Oueslati et al. ............. 345/170 |
| 7,003,598 B1 * | 2/2006 | Kavanagh ..................... 710/62 |
| 2004/0263696 A1 * | 12/2004 | Roger ........................ 348/734 |

\* cited by examiner

*Primary Examiner*—Jeffery Hofsass
*Assistant Examiner*—Sisay Yacob
(74) *Attorney, Agent, or Firm*—Gary R. Jarosik (57) ABSTRACT

A system and method for facilitation and encouragement of user interaction and functionality with a multimedia program via an entertainment system and remote control device. The entertainment system and remote control device are in two-way communication to accomplish various interactivity functions and features. The remote control includes one or more selectively illuminated buttons under the control of the entertainment system, such that when the entertainment system displays a prompt to the user requiring a response, the entertainment system may send a signal to the remote control selectively illuminating the button(s) to indicate to the user that the button(s) may be operated to make a response to the prompt.

26 Claims, 8 Drawing Sheets

REMOTE CONTROL HARDWARE BLOCK DIAGRAM

LED Control command packet
FIGURE 5a

LED Control byte
FIGURE 5b

FIGURE 6 (part 1)

FIGURE 6 (part 2)

REMOTE CONTROL WITH SELECTIVE KEY ILLUMINATION

BACKGROUND OF THE INVENTION

1. Field of the Invention

This invention relates generally to a remote control system. In particular, this invention relates to a system and method for providing one or more selectively illuminated or otherwise highlighted buttons on a remote control device which serve to facilitate and encourage user interaction and functionality with interactive program content via an entertainment system.

2. Description of Related Art

The field of remote control devices having illuminated buttons (or keys) is well established. Such remote control devices typically use one or more wireless technologies (Infrared (IR), Radio Frequency (RF), etc.) to communicate with home appliances (televisions, VCRs, DVRs, DVD players, cable converter boxes, amplifiers, CD players, game consoles, home lighting, drapery, fans, HVAC systems, thermostats, personal computers, etc.) to effectuate any number of desired functions related to the particular appliance, while button illumination features function chiefly to aid the user in correctly identifying and pressing command buttons (for instance in low light scenarios).

Typically, buttons on an illuminated remote control may be of the "hard," or "soft" button type. So called hard buttons are physical buttons generally made of a semi-transparent or translucent material and require mechanical activation by the user (such as pressing on the button) to initiate the sending of commands from the remote control to an appliance. One or more light emitting device (LED) or electroluminescent (EL) units embedded in, or placed below or adjacent the button may be activated, either by control circuitry on the remote control (for instance when the remote control is moved or touched), or by electrical interconnection due to a button press. The following U.S. patents describe such approaches to the illumination of hard buttons in greater detail: U.S. Pat. Nos. 5,568,367, 5,747,756, 5,977,901.

So called soft buttons are touch screen buttons and typically include words, shapes, icons, etc. located on a liquid crystal display (LCD), electro-luminescent display (EL) or the like, to be touched or tapped by a user (or cursor apparatus) to initiate the sending of commands from the remote control to an appliance. Generally, remote control systems including soft buttons are implemented using a single illuminated display screen whereupon various ranges of color, brightness, tint, and contrast may be selectively displayed to indicate the nature and function of a given icon/button, and that a given button may be, or was pressed by a user. By way of example, U.S. Pat. No. 5,410,326 to Goldstein generally describes an icon based touch screen display remote control device for accomplishing a variety of standard remote control functions.

Currently, in interactive applications such as are for example envisaged in conjunction with advanced functionality entertainment and information delivery systems including digital cable or satellite carriers and related set top boxes (STB), home internet gateways, networked multimedia servers and the like, it is desirable to guide and/or encourage the user through the steps involved in purchase transactions, complex menu navigation, play-along game show responses, trivia games, polls, etc.

The cable, satellite, and other home/hospitality based entertainment content providers have used on screen instructions (i.e., on a television connected to a STB) in conjunction with hard button remotes to initiate user selections and purchases, however, such methods have not functioned to selectively control the remote to guide and encourage the user to make such selections or purchases at an appropriate time (such as via an illuminated button on the remote as the question or prompt is displayed on the screen).

The Goldstein patent also describes a mechanism for the display of advertisements on a touch screen based remote control device, and subsequently placing an order from the remote control. However, such a system as described is generally too complex and expensive to implement in scenarios where such functionality would be most valuable (such as in remote controls which ship with STBs and similar home entertainment equipment; also in hotels and other hospitality settings where premium entertainment services are routinely offered to customers via operation of a remote control).

Accordingly, it would be advantageous if a simple, effective system and method existed to direct the user's attention to specific remote control buttons at appropriate times (e.g., a "buy" button during a purchase transaction, "yes" and "no" response buttons during display of a game show question, and the like.) This invention offers a system and method to implement such functionality in a remote control.

SUMMARY OF THE INVENTION

The present invention provides the above mentioned advantages, and overcomes the limitations in the prior art. In particular, this invention relates to a system and method for selectively modifying the appearance of one or more buttons on a remote control device which serve to direct the user's attention to the specific remote control buttons at appropriate times to facilitate advanced user interaction and functionality with an entertainment system during the presentation of interactive program content such as menu or program guide navigation, play-along game show responses, trivia games, polls, purchase transactions, etc.

A better understanding of the objects, advantages, features, properties and relationships of the subject system and method will be obtained from the following detailed description and accompanying drawings which set forth illustrative embodiments which are indicative of the various ways in which the principles of the system and method may be employed.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense.

All publications referenced herein are fully incorporated by reference as if fully set forth herein.

The present invention can find utility in a variety of implementations without departing from the scope and spirit of the invention, as will be apparent from an understanding of the principles that underlie the invention. For instance, the present invention is presently described in conjunction with a hard button remote control in two way communication with a STB, such as a cable or satellite system converter boxes, however it may find utility when used with a plethora of remote control devices (including soft and hard button based remotes) and home appliances, such as televisions, VCRs, DVRs, DVD players, amplifiers, CD players, game consoles, home lighting, drapery, fans, HVAC systems, thermostats, personal computers, etc.

Figure 1:
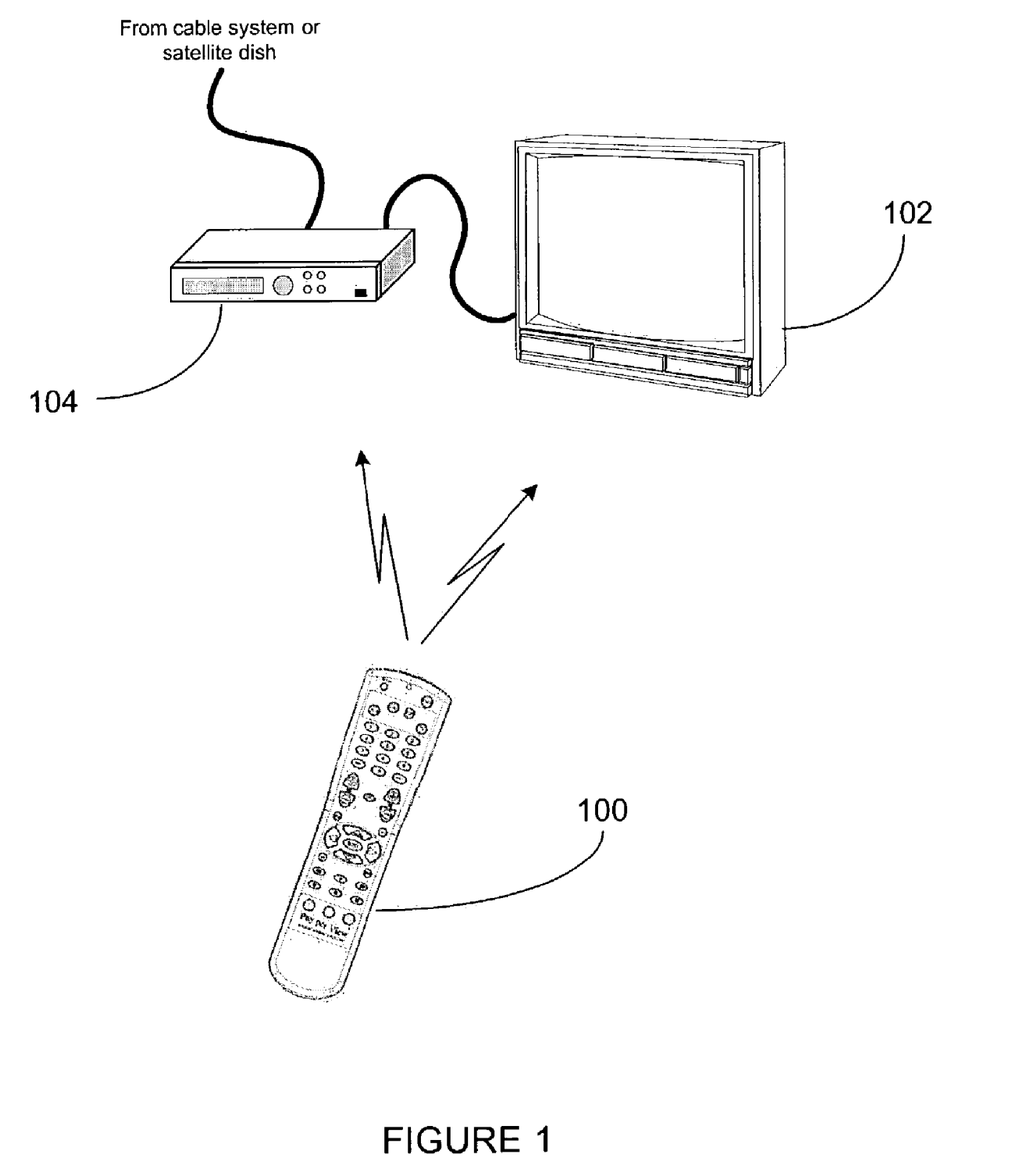
FIG. 1 illustrates an exemplary system employing a method for selectively illuminating buttons on a remote control at appropriate times.

FIG. 1 shows an exemplary system, including a STB 104, a television 102 connected to it, and a remote control 100 for use in conjunction with these devices. In particular, the remote control 100 is capable of bi-directional communication with the STB 104 using any convenient IR, RF, Point-to-Point, or networked protocol, such as for example that described in co-pending U.S. application Ser. No. 10/431, 930 "System and Method for Managing Communication Links" which describes two-way communication method and protocol between a remote control and STB or similar device. It will be appreciated that many other equally suitable two-way communication methods and protocols are well known in the art and may be used instead to accomplish the features and functionality described by the current invention. It will also be appreciated that while the exemplary system is described herein in terms of interactions with a cable or satellite STB, the methods disclosed are equally applicable to other situations in which a remote control unit is used to interact with any entertainment or media system having interactive and/or multimedia programming (such as movies, games, trivia, polls, etc.).

Figure 2:
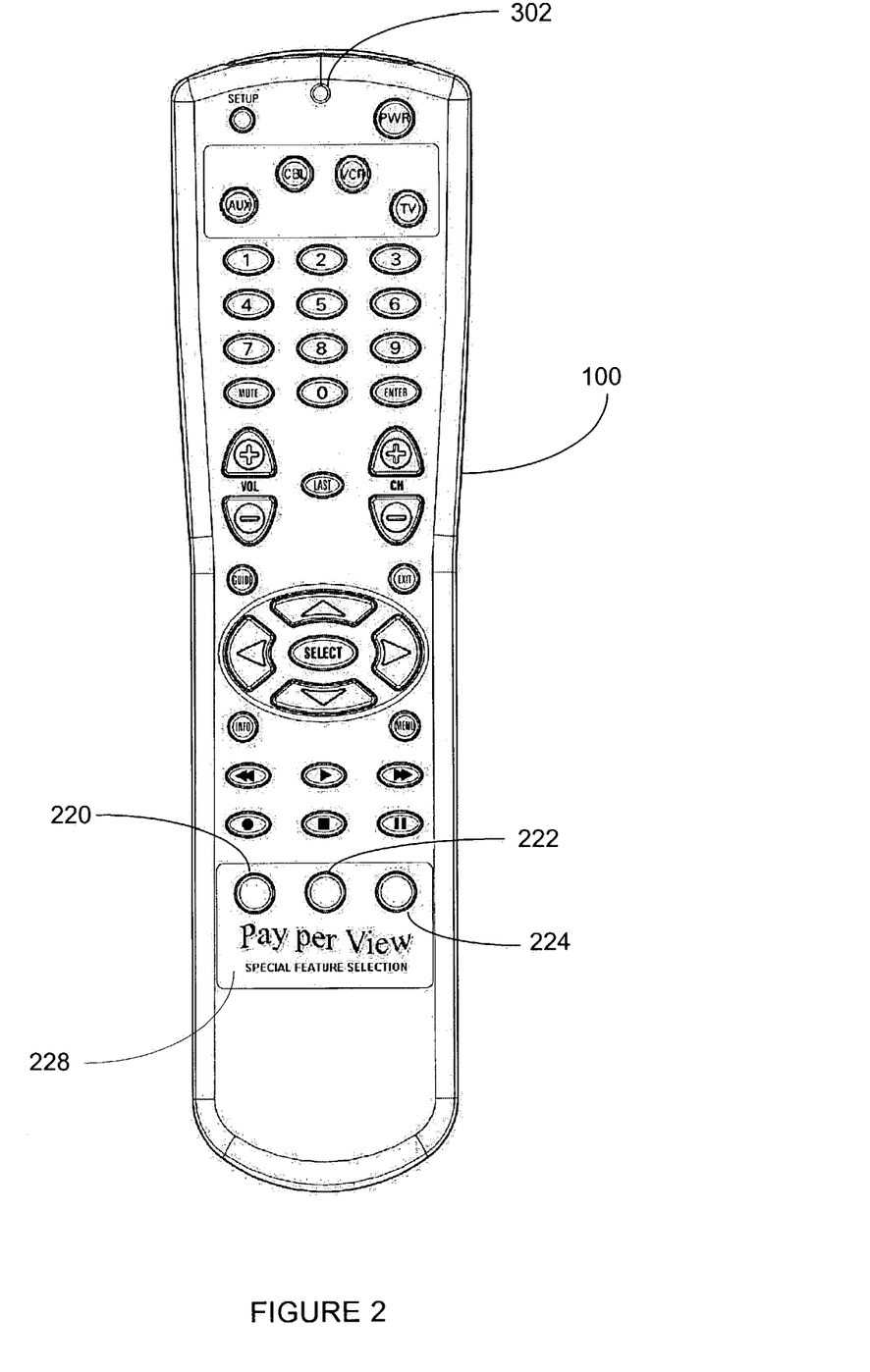
FIG. 2 is a plan view of the user interface for an exemplary remote control according to the current invention.

FIG. 2 provides a more detailed view of an exemplary embodiment of such a remote control 100. In particular, buttons 220, 222, and 224 are provided which may be illuminated under the control of the STB, as will be described in more detail hereinafter. It will be appreciated that the labeling of these buttons ("Pay per View" in the example illustrated) is via a mylar overlay 228 as is well known in the art and may thus be varied according to the type of STB and broadcasting system with which the remote control is supplied.

Figure 3:
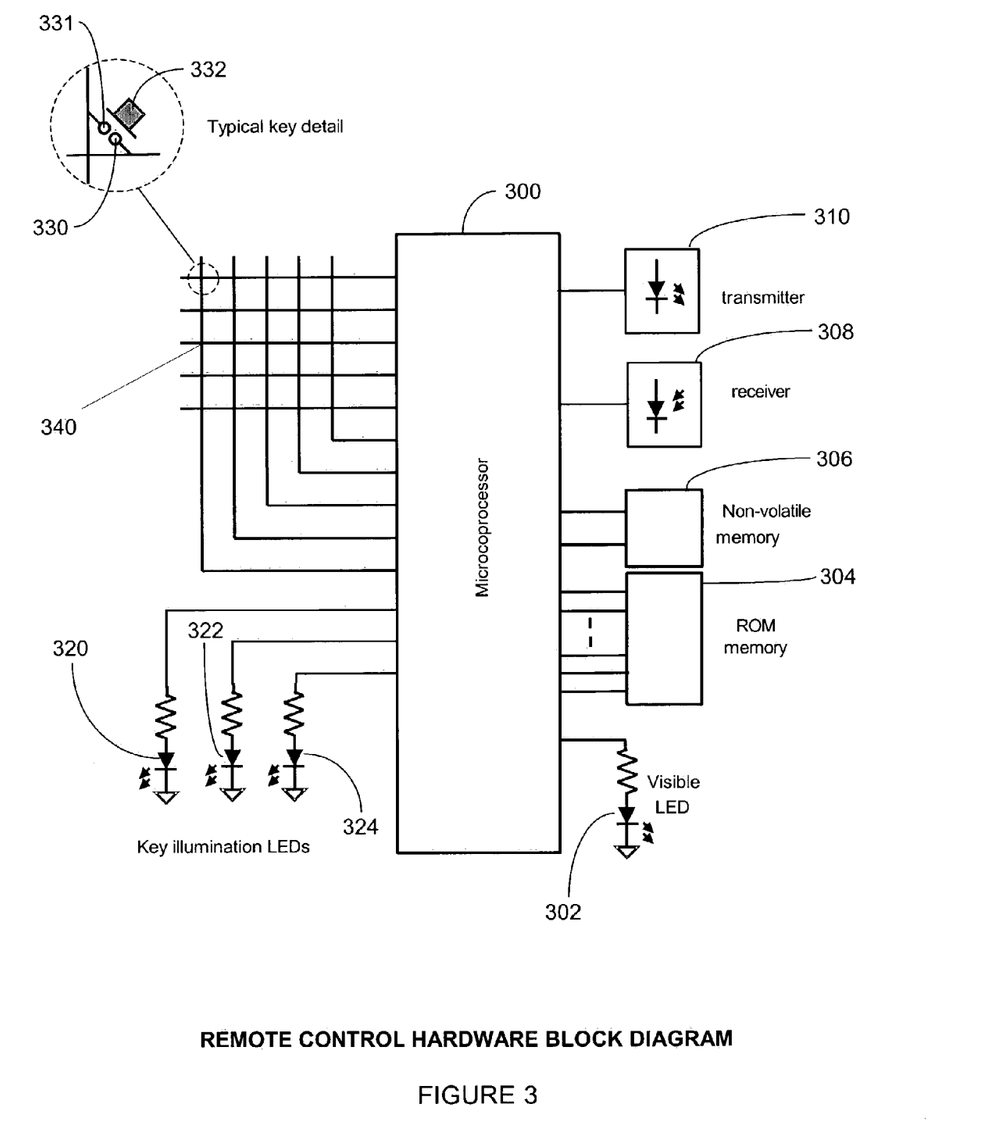
FIG. 3 illustrates a block diagram of components of an exemplary remote control

FIG. 3 illustrates, in block diagram form, an exemplary architecture of remote control 100. For use in transmitting command codes to the STB 104 and/or television 102, the remote control 100 may include, as needed for a particular application, a processor 300 coupled to a ROM memory 304, a button matrix 340 (e.g., hard buttons, soft buttons, or a combination thereof), transmission circuit(s) 310, receiver circuit(s) 308 and/or transceiver circuit(s) (e.g., IR and/or RF), a non-volatile read/write memory 306, a means 302 to provide feedback to the user (e.g., LED, display, speaker, and/or the like), and button illumination means 320, 322, and 324. In the case of a hard button remote, an exemplary molded-in key 332 is shown as operative with key matrix circuit 330, 331. The nature and function of buttons 332 on the remote are described in greater detail below. As will be understood by those skilled in the art, the ROM memory 304 may include executable instructions that are intended to be executed by the processor 300 to control the operation of the remote control 100. In this manner, the processor 300 may be programmed to control the various electronic components within the remote control 100, e.g., to monitor the power supply (not shown), to cause the transmission of signals, and control the illumination of LEDs 320, 322, and 324 in accordance with one aspect of the current invention. The non-volatile read/write memory 306, for example an EEPROM, battery-backed up RAM, Smart Card, memory stick, or the like, may be provided to store setup data and parameters as necessary. While the memory 304 is illustrated and described as a ROM memory, memory 304 can also be comprised of any type of readable media, such as ROM, RAM, SRAM, FLASH, EEPROM, or the like. Preferably, the memory 304 is non-volatile or battery-backed such that data is not required to be reloaded after battery changes. In addition, the memories 304 and 306 may take the form of a chip, a hard disk, a magnetic disk, and/or an optical disk.

To cause the remote control 100 to perform an action, such as selectively illuminating one or more of LEDs 320, 322, o4 324, the remote control 100 is adapted to be responsive to events, such as a sensed user interaction with the button matrix 340, receipt of a transmission via receiver 308, etc. In response to an event, appropriate instructions within the memory 304 may be executed. For example, when a command button is activated on the remote control 100, the remote control 100 may retrieve a command code corresponding to the activated command button from memory 304 and transmit the command code to STB 104 in a format recognizable by STB 104. It will be appreciated that the instructions within the memory 304 can be used not only to cause the transmission of command codes and/or data to the STB 104 and other appliances, but also to perform local operations. While not limiting, local operations that may be performed by the remote control 100 in addition to the selective key illumination features described by the current invention include; displaying information/data, favorite channel setup, macro button setup, function key relocation, etc. Examples of local operations can be found in U.S. Pat. Nos. 5,481,256, 5,959,751, and 6,014,092. Additional examples of remote controls 100 may be found in commonly owned, U.S. Pat. No. 6,225,938 and U.S. application Ser. Nos. 60/264,767, 09/905,423, 09/905, 432, and 09/905,396.

Figures 4A, 4B, 4C:
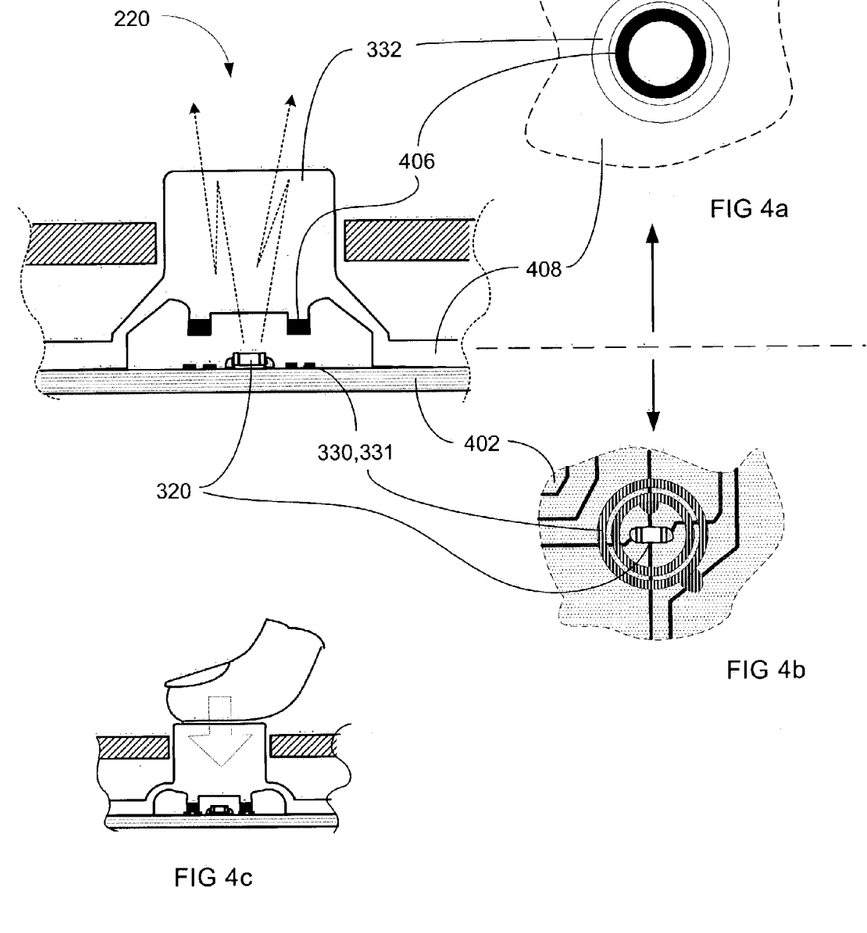
FIGS. 4a, 4b and 4c illustrate side cutaway and schematic plan view of an illuminated button of the exemplary remote control.

FIG. 4 illustrates an exemplary mechanical construction of an illuminated button 220, such as would be used in a hard button remote. As is known in the art, the remote control keypad comprises a silicon rubber sheet 408 with molded-in keys 332, in this case of translucent material at least in the area of the keycap(s) 332 which are to be illuminated. The underside of the key 332 is equipped with conductive carbon puck 406 in the shape of a ring. Key contact areas 331 and 332, comprising conductive ink silk-screened onto the printed circuit board 402 in the form of two concentric rings, are positioned directly below the conductive puck 406 such that the key matrix circuit 330, 331 is completed when key 332 is depressed as illustrated in FIG. 4c. A surface mount type LED 320 is positioned directly below the center of the translucent key 332 such that the key may be illuminated from below when the LED is enabled by the microcontroller 300. Although only a single LED is illustrated for clarity, it will be appreciated that a multi-color LED may be easily substituted. For example, LED devices are available which include two individually-controllable junctions, one red and one green, contained in a single package. With such a device, three colors are possible depending on whether red, green, or both (yellow) LEDs are enabled. Alternatively, two or more individual LEDs may be mounted below or adjacent each key. It will be understood and appreciated that many different layouts and configurations of the key matrix circuit, key contact areas, and LED types and configurations are possible depending on design considerations for a particular remote control, without departing from the spirit and scope of the present invention.

Though not shown in the figures, various labels or indicia of the functions which may be performed by each of buttons 220, 222, and 224 may be attached, affixed, etched, embedded, or the like on or adjacent to the buttons. Such a labeling system may be used in connection with or separate from other indication means as described herein, such as colors, intermittent illumination, animation, etc. Either alphanumeric based symbols, or graphical symbols may be used to indicate the nature and function of each button. By way of illustration and not limitation, labels which may be used in conjunction with buttons to indicate a function include: "Yes," "No," "Buy," "Y," "N," "Maybe," "True," "False," "T," "F," thumbs up symbol, thumbs down symbol, etc. The buttons themselves may also be formed in a shape which represents a label, for instance a button formed in the shape of the letters "Y" or "N." Many other labeling mechanisms are possible without departing from the spirit and scope of the present invention.

Figure 5A:
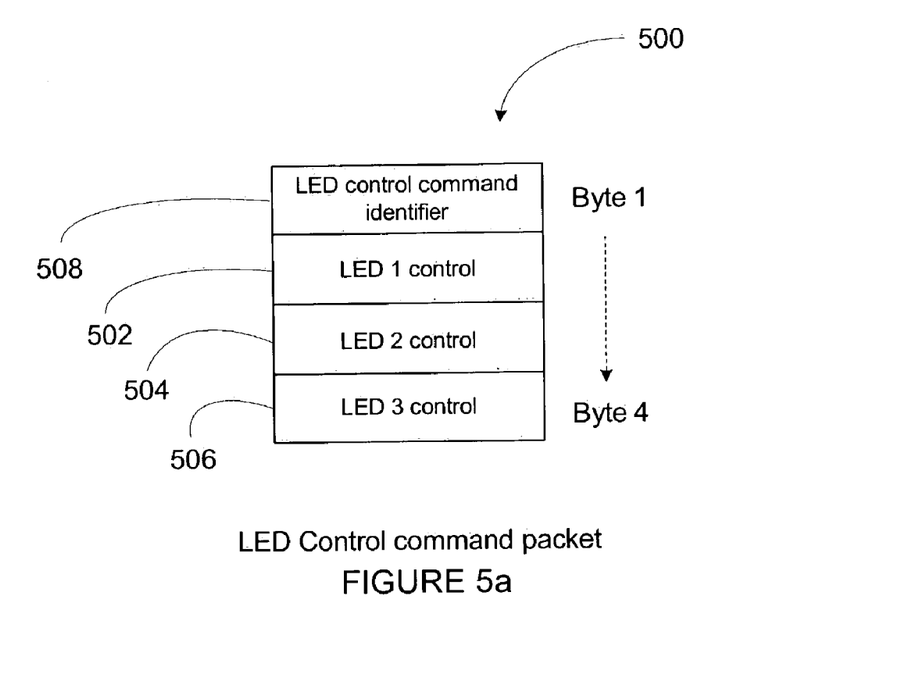
FIG. 5a is a block diagram illustrating an LED control command packet according to the current invention.

FIG. 5 illustrates an exemplary data format which may be used by STB 104 to control operation of the button illumination LEDs 320, 322, 324. Since the protocol described in the aforementioned U.S. application Ser. No. 10/431,930 supports an outbound (STB to remote) transmission packet with a data payload of thirty-two (32) bits, this is conveniently arranged as a four (4) byte value in which the desired status of all three LEDs may be conveyed via a single transmission. It will be appreciated that other field sizes and arrangements may be adopted where more suited to alternative transmission formats, including for example issuing individual LED status commands via separate transmissions.

Figure 5B:
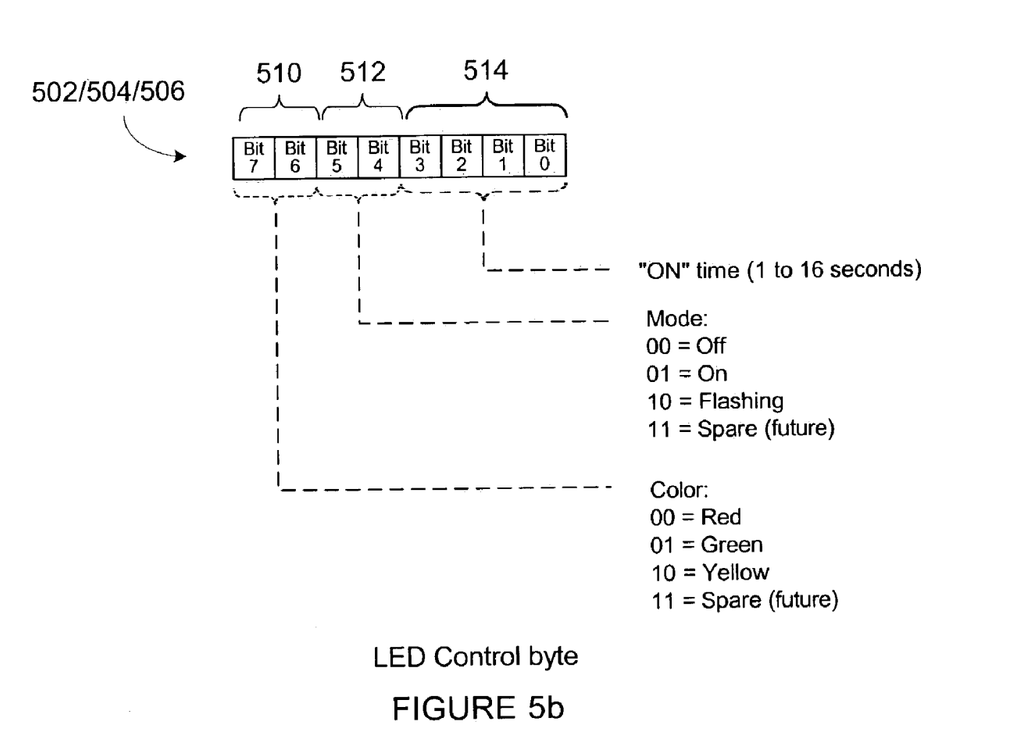
FIG. 5b is a block diagram illustrating an LED control byte according to the current invention.

According to the exemplary embodiment, button related instructions may be sent to the remote control in a four byte block 500 using any number of data carrying signals (IR, RF, etc.) The first byte 508 of the four byte block 500 may contain a specific instruction value to indicate that the current data frame constitutes a LED command. Such a block transmission scheme allows for the transfer of other, non-illumination related, data from the STB to the remote control as necessary, using different initial byte values. More than one type of LED command may also be defined if required by the intended application. For example, one initial byte value may be assigned to indicate to the remote control that other user actions (i.e., button presses) may be permitted during the period the illuminated buttons are active, while a different value may be assigned to indicate that no action other than activation of one of the illuminated buttons is acceptable. In either case, once the data frame is thus identified as a LED control command packet, the remote control firmware may interpret the following three bytes 502, 504, 506 as illumination control parameters for each of the three buttons 220, 222, 224 as follows: The high order two bits 510 of the byte determine the LED color as indicated in FIG. 5b. The next two bits 512 indicate the operating mode of the LED: On, off, or flashing. A spare value is available for future feature expansion—for example, multiple flashing speeds, chasing (one LED at time in rotation), etc. The last four bits 514 indicate the maximum time the key should remain illuminated before it times out and automatically switches off. By way of explanation, this last parameter is to ensure that should communication between the STB and the remote control be interrupted for any reason, battery power will not be wasted by a LED remaining on continuously. In most cases, it is anticipated that the STB will explicitly either shut off the illumination or refresh the timeout value prior to expiration.

Figure 6:
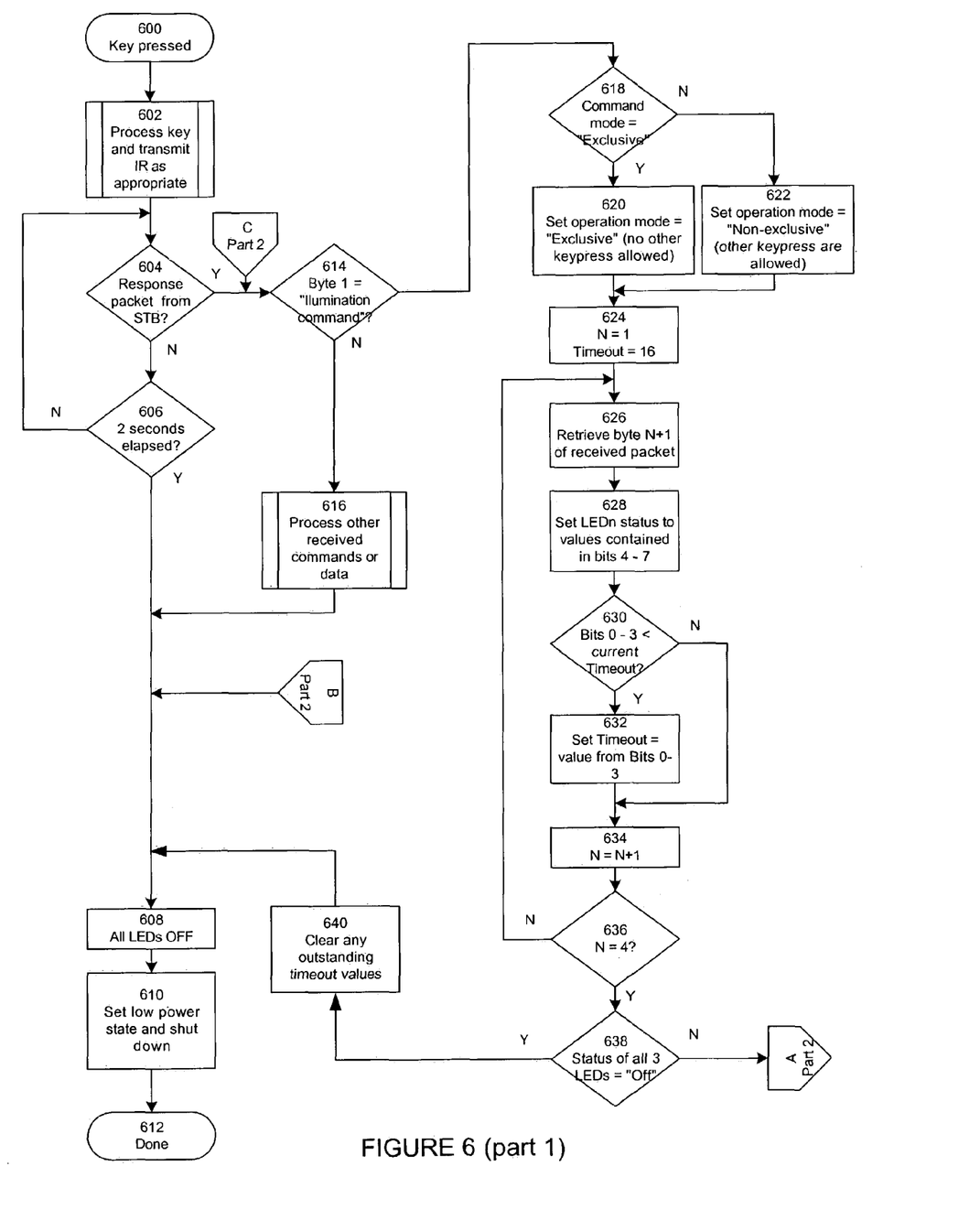
FIG. 6 illustrates a flow chart diagram of exemplary steps used to selectively illuminate a remote control button.

By way of further explanation, the flowchart of FIG. 6 illustrates the processing of the button illumination functionality by the remote control firmware program logic in accordance with the current example system. Since the remote control is a battery-operated device, it is normally in a low-power state and not monitoring the communication link when not in use, thus any two-way communication transaction should be initiated by a user action such as pressing a button on the remote. To effect this, at every key press 600, upon completion of the resulting outbound transmission to the STB 602, the remote control does not immediately return to its low power state but rather waits 604 in the receive mode for a predetermined period of time 606 to monitor for any resulting command response from the STB. If a response is received it is acted upon 614 as appropriate, alternatively if no command response is received within the predetermined time the remote control shuts down its receiver and returns to the low power state 610.

In accordance with one aspect of the present invention, the remote control may support multiple types of LED control command identifiers 508 to cause different functionality. For example, the STB may use two different command identifiers to specify whether (step 618), during the period that keys 220, 222, and/or 224 are illuminated, user key input should be restricted to only the illuminated keys themselves (step 620) or any user key input is permitted (622). The STB may also specify via LED control byte parameter 514 how long the illuminated keys are to remain active awaiting user input before the remote control times out, extinguishes key illumination and returns to normal operation. This timeout may have a default value, e.g., sixteen seconds, established as shown at 624. The remote control operating logic may process the received command bytes 502, 504, 506 extracting the desired LED control parameters as shown in steps 626 through 636 of FIG. 6. As will be appreciated by those skilled in the art, the processing sequence illustrated will result in the shortest of the three possible illumination timeout values being selected (630, 632) as the controlling value. Other approaches (e.g., timing each key individually) are also possible. If the newly-commanded status of all three LEDs is determined to be "Off" at step 638, this is interpreted as a request to terminate all illuminated key processing and exit via steps 640 and 608 through 610. Otherwise, the LED control command are processed as illustrated in Part 2 of FIG. 6.

Referring now to Part 2 of FIG. 6, in an exemplary method of processing LED control commands the remote control operating logic iterates a loop (650 through 676) until the abovementioned timeout value is reached (676) or a new command message is received from the STB (668). LED illumination status is reviewed every 500 mS (via test 672 and path 674, 676, 650). As will be appreciated by those skilled in the art, repeated passes through the logic steps illustrated in steps 652 through 664 will cause those LED with status of "blink" to alternate between on and off states at a 500 mS rate (via steps 656,658) while those LEDs with a status of "on" or "off" will remain in a steady state. Other implementations or timings for blinking LEDs are of course also possible. For example, LEDs might optionally be configured to "chase" one another (i.e., blink on and off in linear succession.) After processing the LED status at the 500 mS interval, the remote control operating logic waits for either a message from the STB 668, a key press by the user 670, or the need 672 to repeat the 500 mS interval processing. If a message is received from the STB, this is processed in the same manner as described earlier in connection with Part 1 of FIG. 6. If a key is pressed by the user, the appropriate infrared code is transmitted to the STB—in all cases if it is one of the illuminated keys, or after checking the exclusive operation status (established in steps 620 or 622) if it is any other key. If the exclusive status is set, other key input is ignored as shown in step 680. It will be appreciated that in the exemplary operation illustrated, key illumination is only extinguished upon explicit command of the STB or by expiry of the timeout value. Alternate implementations are also possible, for example the LEDs may be turned off immediately upon receipt of a user keypress rather than waiting for a command from the STB.

Figure 7:
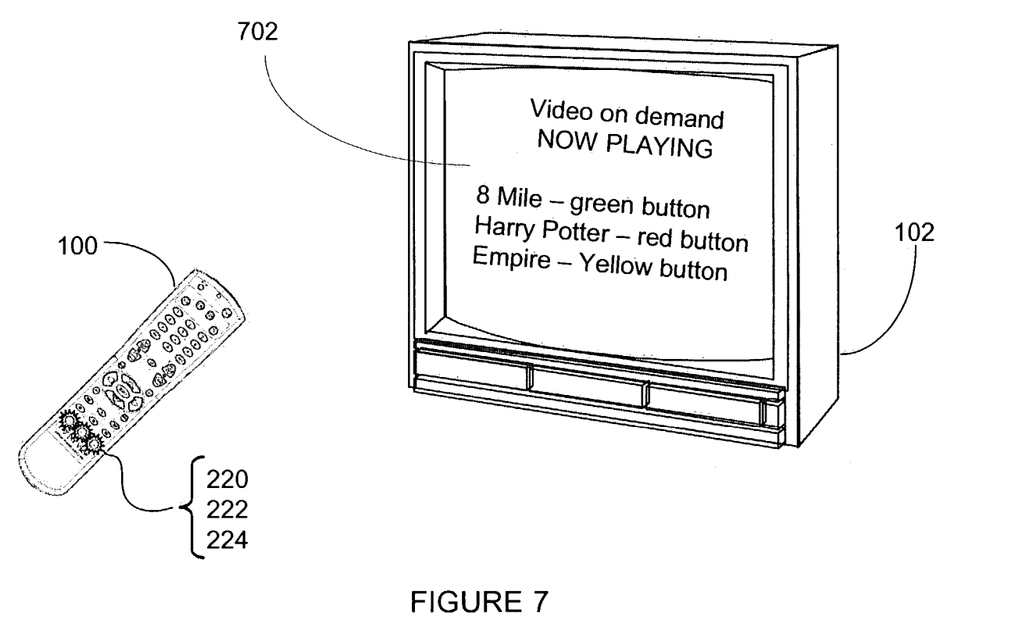
FIG. 7 illustrates an exemplary implementation of the selectively illuminated buttons in conjunction with a multimedia program.
Figure 8:
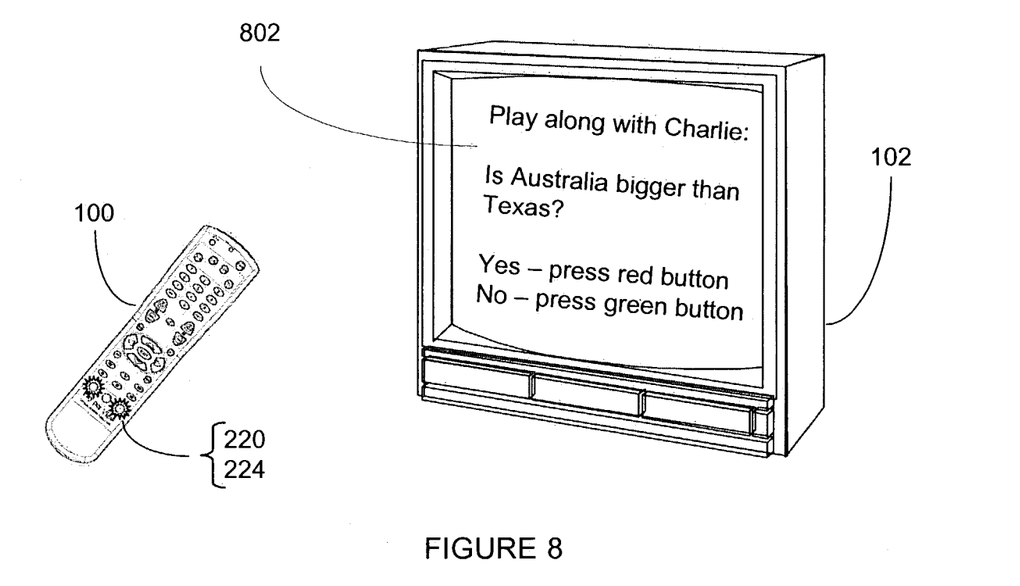
FIG. 8 illustrates another exemplary implementation of the selectively illuminated buttons in conjunction with a multimedia program.

By way of example only, FIGS. 7 and 8 illustrate potential applications of the remote control using selective key illumination features of the present invention. In FIG. 7 all three remote control buttons 220, 222, 224 are illuminated to facilitate the user's purchase of a pay-per-view movie from the menu 702 presented on the TV screen. Pressing any one of these buttons will be interpreted in this context by the STB (not shown) as a request to purchase. In FIG. 8, two remote control buttons 220, 224 are flashing different colors to encourage the user to respond to the play-along quiz question 802 currently on the TV screen. Although only a single remote control is illustrated, it will be appreciated that since the protocol described in the aforementioned U.S. application Ser. No. 10/431,930 allows for the simultaneous operation of multiple peripheral units, more than one remote control may in fact be present, especially when used for family play along games, quiz shows, in classrooms, etc. By way of another example, STB 104 may be configured to send instructions to both an "adult" remote, and a "child" remote. Commands in the instructions for the adult remote may enable the selection of one or more programs (via illuminated or otherwise highlighted button(s)) which may be inappropriate for children, while the commands in the instructions for the child remote will only enable the selection of age appropriate materials via illuminated or otherwise highlighted buttons on the remote.

In another example application, the STB of the current invention does not display a prompt via the TV screen, but rather sends an instruction directly to the remote to illuminate or otherwise modify the appearance of one or more buttons (as described in detail above) as an indication to the user that an event (for example, a favorite show, previously purchased or scheduled Pay-per-View program, weather, earthquake, tornado or other emergency, trivia game, poll, or other multimedia and/or interactive program) is or will soon occur. In this way the system and method of the current invention functions as an alert and notification system using the STB and remote (via the illuminated or otherwise highlighted buttons, or other signaling means on the remote). The indication can serve to notify the user to tune to a specific channel of the display and/or may convey sufficient information itself (e.g., illuminating a label) whereby the user can discern what the event is. It will be appreciated by those skilled in the art that many different types and forms of alerts, indications, and other remote based prompts to notify the user of an event are possible without departing from the spirit and scope of the present invention.

Although described above in terms of a remote control device with illuminated physical buttons, it will be appreciated that remote control units implemented using other technologies such as electroluminescent display panels (as described for example in co-pending U.S. application Ser. No. 10/410,103 "Remote control with Local, Screen Guided Setup"), LCD touch screens (as described for example in co-pending U.S. application Ser. No. 10/288,727 "User Interface for a Hand Held Remote control Device") or the like may employ alternate methods such animation, special icons, alternating colors, etc., to attract the attention of the user, without departing from the spirit and scope of this invention.

Many additional forms and implementations of the remote control enablement apparatus of the present invention could be contemplated for a variety of purposes without departing from the scope and spirit of the current invention.

The system and process of the present invention has been described above in terms of functional modules in block diagram format. It is understood that unless otherwise stated to the contrary herein, one or more functions may be integrated in a single physical device or a software module in a software product, or one or more functions may be implemented in separate physical devices or software modules, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality, and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. Accordingly, it is to be understood that the invention is not to be limited by the specific illustrated embodiments.

What is claimed is:

1. A remote control, comprising:
    a button having an associated means for indicating that the button may be operated to interact with interactive program content;
    a receiving circuit for accepting a transmission received from a source external to the remote control;
    a controlling circuit linked to the receiving circuit and the means for indicating where the controlling circuit functions to activate the means for indicating in response to receipt of the transmission by the receiving circuit; and a transmission circuit for transmitting a signal to a target external to the remote control in response to activation of the button wherein the controlling circuit allows transmission of the signal to the target external to the remote control in response to activation of the button only when the means for indicating is activated.

2. The remote control as in claim 1, wherein the button is a hard button.

3. The remote control as in claim 1, wherein the button is a soft button.

4. The remote control as in claim 1, wherein the means for indicating comprises a visual means.

5. The remote control as in claim 4, wherein the visual means comprises a means for selectively modifying the appearance of the button.

6. The remote control as in claim 5, wherein selectively modifying the appearance of the button comprises animating the button, illuminating the button, or changing the color of the button.

7. The remote control as in claim 6, wherein selectively modifying the appearance of the button is performed intermittently.

8. The remote control as in claim 1, further comprising a label associated with the button indicating the nature of the functionality provided by the button.

9. The remote control as in claim 8, wherein the label resides on the button.

10. The remote control as in claim 8, wherein the label resides adjacent the button.

11. The remote control as in claim 8, wherein the label comprises alphanumeric characters.

12. The remote control as in claim 8, wherein the label comprises a graphical symbol.

13. The remote control as in claim 1, wherein the receiving circuit comprises an IR receiver.

14. The remote control as in claim 1, wherein the receiving circuit comprises an RF receiver.

15. The remote control as in claim 1, wherein the transmitting circuit comprises an IR transmitter.

16. The remote control as in claim 1, wherein the transmitting circuit comprises an RF transmitter.

17. The remote control as in claim 1, wherein the signal comprises data for use in making a purchase, answering a question, or initiating a multimedia program.

18. A method for controlling operation of a remote control having a button and an associated means for indicating that the button may be operated to interact with interactive program content, comprising:

activating the means for indicating in response to a transmission received by the remote control from a source external to the remote control; and allowing the remote control to transmit a signal in response to activation of the button only when the means for indicating is activated.

19. The method as in claim 18, wherein the button is a hard button.

20. The method as in claim 18, wherein the button is a soft button.

21. The method as in claim 18, wherein the means for indicating comprises a visual means.

22. The method as in claim 21, further comprising selectively activating the visual means to modifying the appearance of the button.

23. The method as in claim 22, wherein selectively activating the visual means to modifying the appearance of the button comprises animating the button, illuminating the button, or changing the color of the button.

24. The method as in claim 22, wherein selectively activating the visual means is performed intermittently.

25. A system for facilitating and encouraging user interaction with program content, the system comprising;

an entertainment system for providing and displaying the program content, including a prompt which requests a response from the user, and for transmitting at least one instruction to the remote control; and a remote control having at least one button, the remote control being responsive to the instruction for modifying the appearance of the at least one button in accordance with the instruction from a first displayed state to a second displayed state to indicate to the user that a response may be made to the prompt via operation of the at least one button while the appearance of the at least one button is in the second displayed state;

wherein the instruction comprises a data signal including at least a control command identifier for indicating that the instruction is a button based command;

wherein the control command identifier further includes a command for restricting operation of the remote control such that only the at least one button indicated by the instruction may be operated: and wherein the command for restricting operation is activated for a preset time period.

26. The system as in claim 25, wherein the remote control has programming for selectively modifying the appearance of the at least one button by animating the button, illuminating the button, or changing the color of the button.

* * * * *